Jan. 18, 1966 J. B. McLEAN ETAL 3,229,877

METHOD AND APPARATUS FOR STORAGE AND SELECTIVE RETRIEVAL OF MAGNETICALLY RECORDED DATA

Filed Jan. 31, 1964 2 Sheets-Sheet 1

INVENTORS
JOHN B. McLEAN
AND EDWARD MORENOFF
BY
Wade Koontz
Martin J. Finnegan
ATTORNEYS METHOD AND APPARATUS FOR STORAGE AND SELECTIVE RETRIEVAL OF MAGNETICALLY RECORDED DATA Filed Jan. 31, 1964 2 Sheets-Sheet 2

INVENTORS
JOHN B. McLEAN
AND EDWARD MORENOFF
BY
Wade Koontz
Martin P. Finnegan
ATTORNEYS United States Patent Office
3,229,877
Patented Jan. 18, 1966

3,229,877

METHOD AND APPARATUS FOR STORAGE AND SELECTIVE RETRIEVAL OF MAGNETICALLY RECORDED DATA

John B. McLean, Utica, and Edward Morenoff, Rome, N.Y., assignors to the United States of America as represented by the Secretary of the Air Force Filed Jan. 31, 1964, Ser. No. 341,808
3 Claims. (Cl. 226—8)
(Granted under Title 35, U.S. Code (1952), sec. 266)

Figure 1:
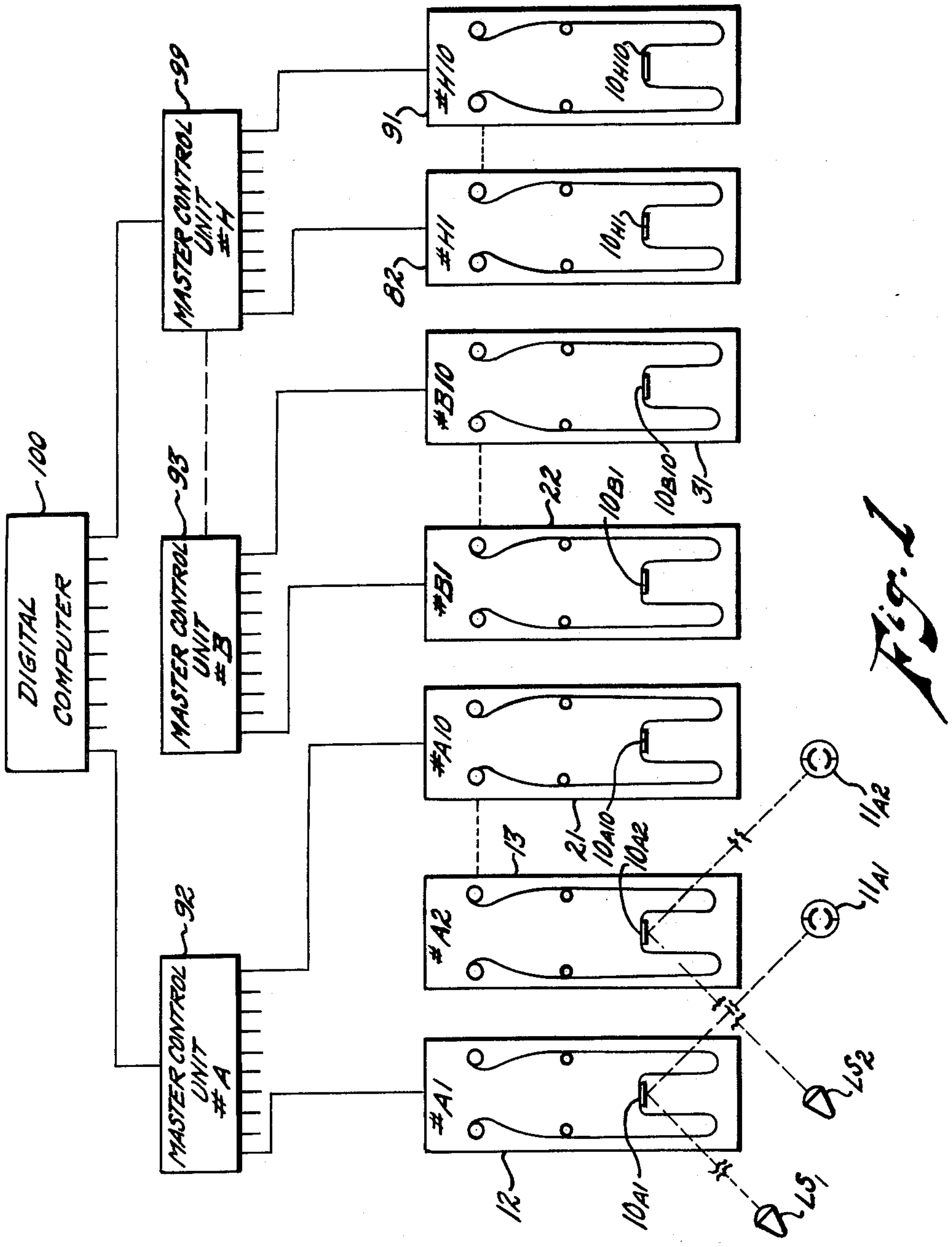

This invention described herein may be manufactured and used by or for the United States Government for governmental purposes without payment to us of any royalty thereon.

This invention relates to digital computing, and particularly to the function of retrieval of data stored in the form of magnetized segments of magnetic tape.

A primary object of the invention is to provide methods and apparatus for conjoint operation of a multiplicity of magnetic tape units by a single master control unit (or limited number of control units); that is, for enabling multiple magnetic tape units connected to a single master control unit to simultaneously have multiple tapes in motion. Each of the magnetic tape units possess individual sensing mechanisms, independent of data read/write heads and circuitry, which are activated by the detection of physical markers spaced along the reel of magnetic tape. Upon detection of a physical marker, the sense mechanism either halts its respective magnetic tape unit and/or causes an "interrupt" to be generated to be sent to the digital computer to which the master control unit is attached.

For typical large-scale digital computer systems, one tape control unit can control the operation of in the order of 10 magnetic tape units. In the normal mode of operation of such a system, only one tape unit may be searched for data at a time, while the remaining tape units remain idle. The only exception to this occurs when one or more tapes are being rewound while one tape is being read or written on. This exceptional condition exists because the magnetic tape units are generally provided with additional sensing mechanisms which function independently from the tape control unit read/write mechanism to detect the physical ends of tape. For example, in one computer system, photo cells are placed in each tape unit to automatically detect aluminum reflecting strips called markers, denoting the physical end of tape. Thus, once a rewind instruction has been given to a particular tape unit, the tape control unit is free to service other tape units.

Consideration of possible methods of obtaining multiple tape movement without the expense of multiple control devices, and study of the method of identifying the ends of the tape, has resulted in the herein-disclosed invention to which is applied the coined name RAPTAP (Rapid Access Parallel Tape.) A reel of standard magnetic tape can be segmented into specific sections by markers ordinarily used to denote the end of tape. Each of these short sections will appear to the computer as a total normal tape reel. Minor hardware modification to the tape units, and the manner in which their instructions are interpreted, enable the tapes already positioned at a marker to be moved in either the forward or backward direction to the next marker. Because the read mechanism is not required to move the tape from marker to marker, the tape can be moved between markers from which data is not desired, at least as fast as the rapid rewind type speed, and in cases where the specification of the tape units otherwise permit, even faster. Once motion to the next marker is initiated, the tape control unit is immediately free to service another tape unit, thus permitting multiple tape movement. A significant gain achieved by the segmentation of the tape into short sections, is the ability to modify data on the tape without having to reproduce the entire tape. This facilititates updating of multiple files on a demand basis, rather than batching, now a common practice, and allows for sequential man/machine operation on a low time delay updating and data utilization basis.

In the drawings:

FIG. 1 is a schematic diagram showing eight master control units 92 to 99, each controlling ten parallel tape reels 12 to 91 mounted on eighty individual magnetic tape units A1 to H10, connected in groups of ten to the master control units which in turn are connected to a digital computer 100. For purposes of illustration, each magnetic tape unit is shown with a photo-electric cell 11 as the sense mechanism and the physical markers are aluminized strips 10, illuminated from light sources LS. It must be noted that the implementation of this technique is not solely limited to use of photo-electric cells and aluminized strips, but any other means such as perforations in the tape, mechanical deformations (notching, indenting, crimping, etc.) or other methods obvious in the art which do not require the single master control unit's continuous attention might serve the same end. In this illustrative case, each photo-electric cell is subject to activation on each separate magnetic tape unit only on those occasions when the light reflecting aluminized markers are detected, thus denoting the end of a tape reel segment.

Figure 2:
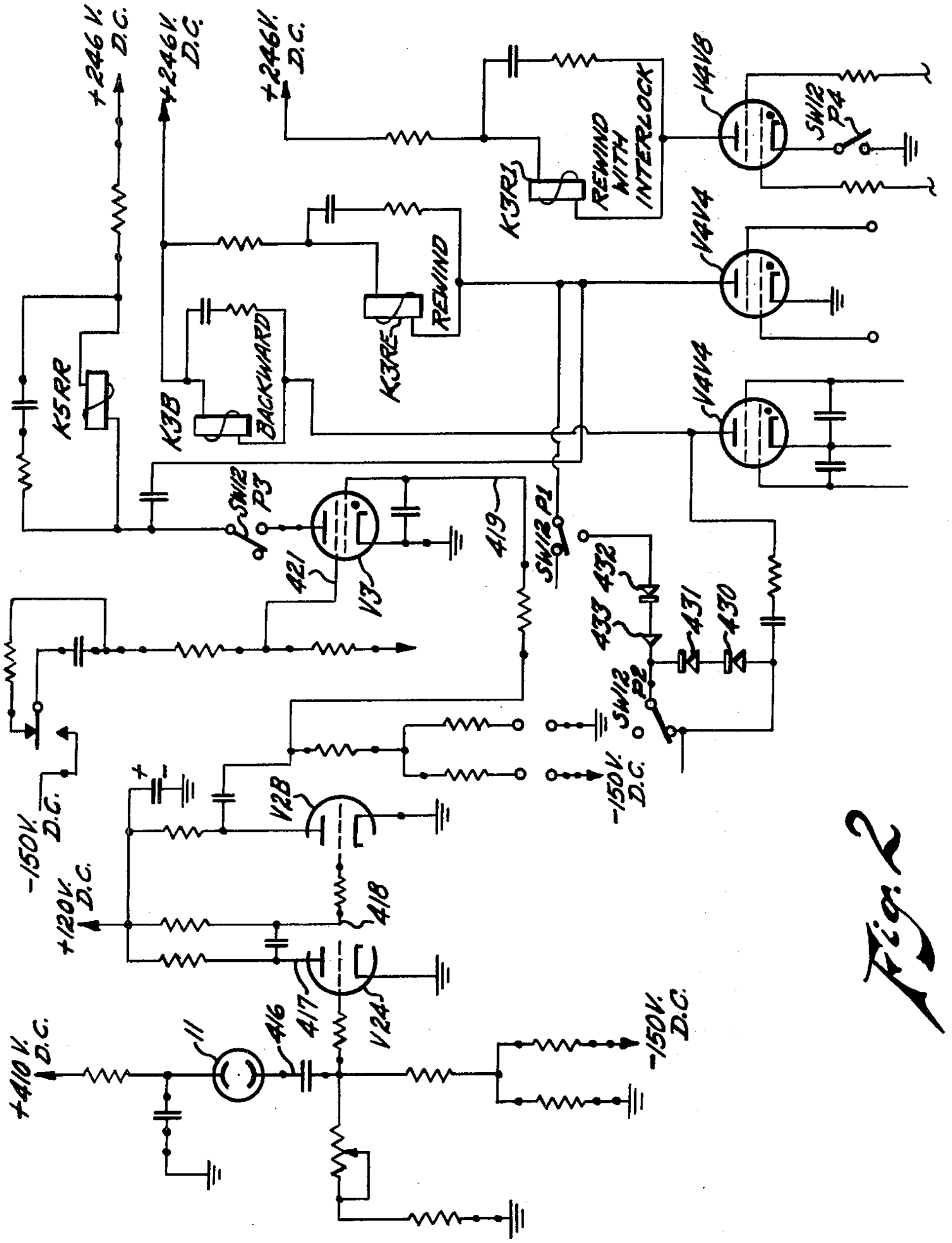

FIG. 2 is a circuit diagram showing electronic elements operable in response to activation of the photocell of FIG. 1, said electronic elements being parts of the operational controls for the magnetic tape units indictated schematicall yin FIG. 1. It should be re-emphasized that implementation depicted in FIG. 2 is for illustrative purposes only, and the RAPTAP is not limited to use of photo-cells, aluminized strips, or the associative electronic elements as shown in FIG. 2.

*Typical RAPTAP invention operation*

The RAPTAP invention method of operation is possible because of the existence of sensing mechanisms to detect the presence of the end of tape markers, independent of the read/write circuitry. The distances between the markers, when used in the RAPTAP method, could be chosen such that the start-stop times are negligible compared to the length of time the tape is in rapid movement. For example, if the length of the tape reel is 2400 feet, then 30 markers could be placed 80 feet apart on the reel. If the speed at which the tape is moved is in the order of 40 feet/second, then approximately two seconds are required to move from one marker to the next. The start-stop times are in the order of milliseconds and may be neglected. The computer time to make the required comparisons is of the order of microseconds.

Further consideration of illustrative example depicted in FIG. 1 and FIG. 2 can more accurately describe a typical RAPTAP invention method of operation. In FIG. 1 it can be seen that the aluminum markers 10 on the tape reflect incident light to a much greater degree than the ordinary magnetic tape surface. This increase in light reflection is detected by the photo-electric cell 11, causing a sharp decrease in the electrical resistance of the photo cell. The resulting shift in D.C. level is changed to an A.C. signal at the input to the amplifier-shaper, tubes V2A, V2B, and associated circuits (416, 417, and 418, FIG. 2). The application of the positive portion of the amplifier-shaper output by way of circuit 419 leading to the control grid of V3, the extinguish thyratron (see FIG. 2), causes V3 to fire and relay K5RR, the RAPTAP relay, to be activated, i.e. relay K5RR is opened. The opening of the relay K5RR fires the brake thyratrons, thus halting the motion of the magnetic tape. The firing of V3 also couples the negative portion of the plate potential to the plate of V4V6, the rewind thyratron (see FIG. 2) causing the rewind relay, K3RE, to drop out and the rewind thyratron, V4V6, to be extinguished. When the rewind thyratron, V4V6, is extinguished, the magnetic tape unit is ready to repeat the process again. In particular, the next rewind command will fire the rewind thyratron, V4V6, which in turn will extinguish the extinguished thyratron, V3, and close the RAPTAP relay, K5RR, and the rewind relay, K3RE. Tape motion is then initiated and the halt process is repeated when a reflective marker is detected by the photo-electric cell.

In the particular illustrative example under consideration, the movement of the tape forward in the RAPTAP method, i.e. movement forward independent of the read/write circuitry and the master control unit, was accomplished by modification of the standard "Rewind with Interlock" instruction of the magnetic tape unit. In particular, in the Rewind with Interlock thyratron, V4V6, a switch, SW12, has been added in the cathode circuit which when in the RAPTAP method, prevents the thyratron from conducting as in the case of non-RAPTAP operation. In addition, back-to-back diodes 430–433 are provided to allow the backward thyratron, V4V4, and the rewind thyratron, V4V6, to be fired and extinguished independently. As a result of the addition of the back-to-back diodes, the rewind thyratron can be fired simultaneously with the forward thyratron upon receipt of the Rewind with Interlock instruction, causing the tape to move forward in the RAPTAP method.

It should again be emphasized, that the circuits found in FIGURES 1 and 2, and their operation described above, is only for illustrative purposes, and that the RAPTAP technique may be implemented not only by use of photo cells and associated electronics, but by any other means obvious to the state-of-the-art not requiring that continuous attention of a master control unit be devoted during the motion of a magnetic tape reel on a magnetic tape unit.

What is claimed is:

1. In a magnetic tape memory system for the storage of data in the form of magnetically retrievable bits of coded intelligence, the method of expediting the retrieval of desired intelligence which comprises the steps of applying to a series of magnetic tapes a plurality of monitoring elements, at points along the several tapes corresponding to intelligence-containing segments of said tapes, applying high speed motivation to all of said tapes in unison, and interrupting the high speed motivation of one of said tapes whenever a monitoring element on said tape reaches a predetermined position in the operating cycle.

2. In a magnetic tape memory system for the storage of data in the form of magnetically retrievable bits of coded intelligence, means for expediting the retrieval of desired intelligence from a series of magnetic tapes, said means comprising a plurality of light-reflecting tape monitoring elements, at points along the several tapes corresponding to intelligence-containing segments of said tapes, means for applying high speed motivation to all of said tapes in unison, and means for interrupting the high speed motivation of one of said tapes whenever one of said monitoring elements reaches a predetermined position in the operating cycle.

3. In a magnetic tape memory system, a plurality of tapes and a common drive means for moving said tapes in unison, means including a plurality of thyratron control circuits for activating said common drive means, and means including light-reflecting monitoring elements distributed along the several tapes at points corresponding to intelligence-containing segments of said tapes for controlling the energization and de-energization of said thyratron circuits, said last-named means further including a light-sensitive control circuit responsive to the arrival of one of said light-reflecting monitoring elements at a predetermined control point adjacent said light-sensitive control circuit.

References Cited by the Examiner

UNITED STATES PATENTS

| | | | |
|---|---|---|---|
| 2,576,529 | 11/1951 | McKenny et al. | 226—45 X |
| 3,060,799 | 10/1962 | Myer | 226—109 X |
| 3,115,289 | 12/1963 | Mamenyi-Katz | 226—45 X |
| 3,184,177 | 5/1965 | Hannah | 226—45 X |

FOREIGN PATENTS

| | | |
|---|---|---|
| 334,267 | 9/1930 | Great Britain. |

M. HENSON WOOD, Jr., *Primary Examiner.*

ALLEN N. KNOWLES, *Assistant Examiner.*